US012362511B2

(12) United States Patent
Wang

(10) Patent No.: US 12,362,511 B2
(45) Date of Patent: Jul. 15, 2025

(54) WIRE CONNECTION TERMINAL AND WELDING JOINT

(71) Applicant: JILIN ZHONG YING HIGH TECHNOLOGY CO., LTD., Changchun (CN)

(72) Inventor: Chao Wang, Changchun (CN)

(73) Assignee: JILIN ZHONG YING HIGH TECHNOLOGY CO., LTD., Changchun (CN)

( * ) Notice: Subject to any disclaimer, the term of this patent is extended or adjusted under 35 U.S.C. 154(b) by 352 days.

(21) Appl. No.: 17/916,768

(22) PCT Filed: Apr. 1, 2021

(86) PCT No.: PCT/CN2021/084925
§ 371 (c)(1),
(2) Date: Oct. 3, 2022

(87) PCT Pub. No.: WO2021/197425
PCT Pub. Date: Oct. 7, 2021

(65) Prior Publication Data

US 2023/0163503 A1 May 25, 2023

(30) Foreign Application Priority Data

Apr. 1, 2020 (CN) ......................... 202020456074.7

(51) Int. Cl.
*H01R 13/03* (2006.01)
*H01R 4/02* (2006.01)
(Continued)

(52) U.S. Cl.
CPC ............. *H01R 13/03* (2013.01); *H01R 4/023* (2013.01); *H01R 4/029* (2013.01); *H01R 4/58* (2013.01);
(Continued)

(58) Field of Classification Search
CPC ........ H01R 13/03; H01R 4/023; H01R 4/029; H01R 4/58; H01R 11/12; H01R 43/02; H01R 43/16
(Continued)

(56) References Cited

U.S. PATENT DOCUMENTS

2017/0025769 A1* 1/2017 Tokunaga .............. H01R 4/184

FOREIGN PATENT DOCUMENTS

CN 101212094 A 7/2008
CN 106165200 A 11/2016
(Continued)

OTHER PUBLICATIONS

First Office Action and Search Report issued on Mar. 6, 2024 for counterpart Canadian Patent Application No. 3,173,885, 3 pages.
(Continued)

*Primary Examiner* — Peter G Leigh
(74) *Attorney, Agent, or Firm* — Michael Fedrick; LOZA & LOZA, LLP

(57) ABSTRACT

A wire connection terminal and a welding joint. The novel wire connection terminal includes a terminal substrate (1) provided with a fixing portion for connecting with an electric device and a connecting portion for connecting with a wire (2). The fixing portion is provided with an assembly structure for being assembled with the electric device. The connecting portion is provided with a boss (13) formed by punching the connecting portion for connecting with the wire (2). The wire connection terminal is used for directly welding processing by matching a welding fixture, so as to improve the processing accuracy of the terminal, and avoid brittleness and breakage caused by stress concentration of the terminal.

20 Claims, 3 Drawing Sheets

(51) Int. Cl.

| | |
|---|---|
| ***H01R 4/58*** | (2006.01) |
| ***H01R 11/12*** | (2006.01) |
| ***H01R 43/02*** | (2006.01) |
| ***H01R 43/16*** | (2006.01) |

(52) U.S. Cl.
CPC ............. *H01R 11/12* (2013.01); *H01R 43/02* (2013.01); *H01R 43/16* (2013.01)

(58) Field of Classification Search
USPC .......................................................... 439/886
See application file for complete search history.

(56) References Cited

FOREIGN PATENT DOCUMENTS

| | | | | | |
|---|---|---|---|---|---|
| CN | 106684074 | A | * | 5/2017 | ............. H01L 23/48 |
| CN | 206595440 | U | | 10/2017 | |
| CN | 209104263 | U | * | 7/2019 | |
| CN | 110289511 | A | * | 9/2019 | |
| CN | 210137032 | U | * | 3/2020 | |
| CN | 211858910 | U | | 11/2020 | |
| DE | 2832003 | A1 | | 2/1979 | |
| DE | 10302270 | A1 | * | 8/2004 | ........... H01R 11/283 |
| DE | 112014005709 | T5 | | 9/2016 | |
| JP | 11214113 | A | * | 8/1999 | |
| JP | H11214113 | A | | 8/1999 | |
| JP | 2000260502 | A | | 9/2000 | |
| JP | 2003163302 | A | | 6/2003 | |
| JP | 3438809 | B2 | * | 8/2003 | |
| JP | 200573178 | A | | 3/2005 | |
| JP | 2005073178 | A | | 3/2005 | |
| JP | 2011165618 | A | * | 8/2011 | |
| JP | 2014235777 | A | | 12/2014 | |
| JP | 2019145263 | A | | 8/2019 | |
| WO | 2014168215 | A1 | | 10/2014 | |
| WO | 2016039093 | A1 | | 8/2015 | |
| WO | 2020105152 | A1 | | 5/2020 | |

OTHER PUBLICATIONS

First Office Action issued on Apr. 24, 2024 for counterpart Vietnamese Patent Application No. 1-2022-06854, along with the English translation, 4 pages.
Notice of Termination of Reconsideration by Examiners before Appeal Proceedings and Reconsideration Report by Examiner before Appeal issued by the Japanese Patent Office for corresponding Japanese Patent Application No. 2022-560268, mailed on May 7, 2024, with an English translation, 7 pages.
First Office Action issued on May 28, 2024 for counterpart Korean Patent Application No. 10-2022-7037423, 12 pages.
Office Action for corresponding Japanese Patent Application No. 2022-560268 dated Feb. 6, 2023.
International Search Report for corresponding International Patent Application No. PCT/CN2021/084925, dated Jun. 24, 2021.
Second Office Action issued for corresponding Japanese Patent Application 2022-560268 mailed on Jul. 25, 2023.
Extended European Search Report issued on Sep. 15, 2023 for counterpart European patent application No. 21780183.6.
Decision of Dismissal of Amendment by the Japanese Patent Office issued for corresponding Japanese Patent Application No. 2022-560268 mailed on Nov. 14, 2023, with an English translation.
Office Action dated Nov. 12, 2024 in corresponding Japanese Patent Application No. 2022-560268.

* cited by examiner

WIRE CONNECTION TERMINAL AND WELDING JOINT

CROSS-REFERENCE TO RELATED APPLICATIONS RELATED APPLICATION

The present application is the U.S. national stage of International Patent Application No. PCT/CN2021/084925, filed on Apr. 1, 2021, which claims the benefit of priority to Chinese Utility Model Patent Application No. 202020456074.7, filed on Apr. 1, 2020, and entitled "NOVEL WIRE CONNECTION TERMINAL AND WELDING JOINT". The disclosures of the foregoing applications are incorporated herein by reference in their entirety.

TECHNICAL FIELD

The present disclosure relates to terminals used in the electrical field, and more particularly, to a wire connection terminal with a terminal substrate, and a welding joint with the wire connection terminal.

BACKGROUND

The wire connection terminal is a connector for connecting a wire and an electrical device conveniently. At present, the universal welding terminal generally uses a solid columnar structure for welding, the terminal has a large volume and thus causes waste of material. In addition, the welding terminal used at present is subjected to firstly hot forging and stamping process and then machining process, and the processing cost is very high. In addition, there are the follow drawbacks: 1) the processing precision of the terminal used for welding can only reach ±0.4 mm, which cannot meet the precision requirements of the welding equipment fixture and the assembly requirements during subsequent loading; (2) in the process of hot forging, the blank of the welding terminal needs to be heated to 700° C. to 850° C., and the surface oxidation of the welding terminal is serious, which will reduce the mechanical and electrical properties of the welding joint made subsequently from the welding terminal; 3) in the process of tempering after heating, if the temperature is not uniform, the welding terminal will be brittle, the welding terminal will be damaged in the subsequent processing and installation, which may affect the assembly of the welding terminal and may cause the welding terminal to fall off or short circuit in serious cases, and may result in heat generation and combustion accident.

Accordingly, there is an urgent need in the electrical field for a wire connection terminal which is light in weight, simple in manufacturing process and low in cost, and a welding joint with the wire connection terminal.

SUMMARY

In order to overcome the defects of the prior art, the present disclosure provides a novel wire connection terminal, which is directly used for welding processing by matching a welding fixture, so as to improve the processing accuracy of the terminal, and avoid brittleness and breakage caused by stress concentration.

To achieve the above object, the present disclosure specifically adopts the following technical solutions.

A novel wire connection terminal including a terminal substrate provided with a fixing portion for connecting with an electric device and a connecting portion for connecting with a wire, wherein the fixing portion is provided with an assembly structure for being assembled with the electric device, and the connecting portion is provided with a boss formed by punching the connecting portion for connecting with the wire;

A welding joint including a novel wire connection terminal according to the present disclosure, and a wire, wherein the wire is connected to the boss of the novel wire connection terminal by welding.

Compared with the prior art, the present disclosure has the following advantageous effects.

1. The novel wire connection terminal of the present disclosure is manufactured by using a terminal substrate, compared with the existing terminal using a solid terminal, the structure is simpler, the material used are reduced by two-thirds, and the processing time is greatly reduced, thus greatly improving the production efficiency of the terminal.
2. Compared with the dimensional accuracy of the terminal processed by the hot forging process which can only reach ±0.4 mm, the dimensional accuracy of the novel wire connection terminal of the present disclosure can reach ±0.03 mm. Therefore, the product quality of the welding joint of the present disclosure is improved and the scrap rate of the welding joint is reduced.
3. The terminal substrate of the present disclosure is a copper plate with a flatness not greater than ±85 mm, which can effectively ensure the processing precision of the terminal in the production process, and avoid the problem of installation deformation caused by excessive flatness of the conventional solid terminal.
4. In the novel wire connection terminal of the present disclosure, the surface of the fixing portion or/and the connecting portion is provided with a plating layer with a thickness of 0.01-1000 μm, which can effectively prevent oxidation of the terminal and prolong the service life of the terminal.
5. The boss and the assembly structure in the novel wire connection terminal according to the present disclosure are formed by punching, the mounting post may be formed by riveting or welding, the terminal has no heat treatment effect, no stress concentration, and no brittleness and breakage in use.
6. The cross section of the boss of the present disclosure is circular, oval, polygonal, or special-shaped, which can be suitable for matching the corresponding cross-sectional shape of the wire, and facilitating to make the welding joint.
7. The assembly structure according to the present disclosure is a mounting hole, a mounting post, or a threaded post, and is arranged in various cross-sectional shapes, so as to be matched with various types of electrical devices, thus providing a variety of choices for joint designers.
8. In the present disclosure, the angle between the fixing portion and the connecting portion is more than 0 degrees and less than or equal to 270 degrees, so that the fixing portion and the connecting portion can be conveniently connected with electrical devices of different angles, which ensures that the wire is not bent at a large angle when the welding joint is assembled, thereby preventing breakage of the wire due to excessive stress.

The above description is merely an overview of the technical solution of the present disclosure. In order to better understand the technical features of the present disclosure and implement the technical features according to the specification, and in order to make the above and other objects, features, and advantages of the present disclosure be easier to understand, detailed description will be given below by combining exemplary embodiments in conjunction with the accompanying drawings.

1. terminal substrate; 11. mounting hole; 12. mounting post; 13. boss; 2. wire.

DETAILED DESCRIPTION

In order to further illustrate the technical features and effects of the present disclosure for achieving the intended object of the present disclosure, hereinafter specific embodiment, structure, features and functions thereof according to the present disclosure are described in detail in conjunction with the drawings and exemplary embodiments as follows.

The First Embodiment

Figure 1:
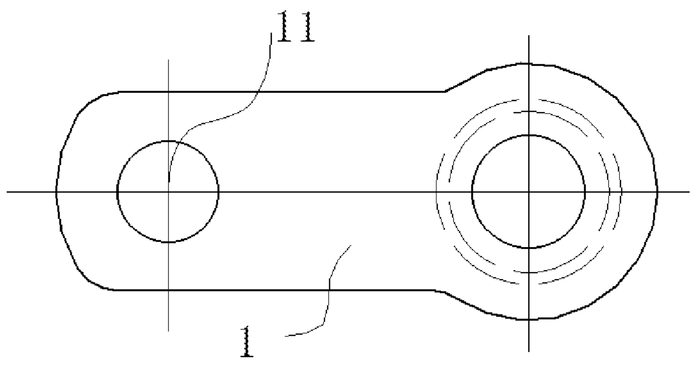
FIG. 1 is a front view of a wire connection terminal according to the First Embodiment of the present disclosure.
Figure 2:
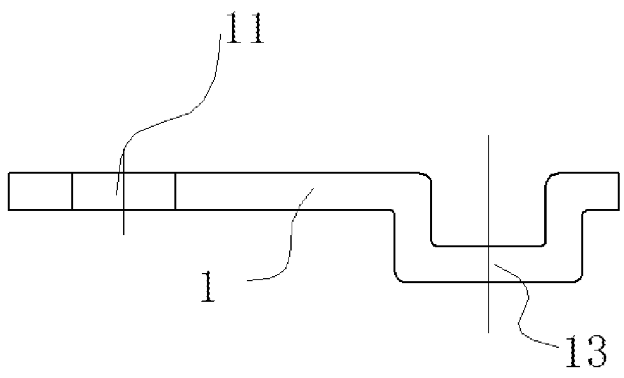
FIG. 2 is a side view of a wire connection terminal according to the First Embodiment of the present disclosure.

As shown in FIGS. 1 and 2, the novel wire connection terminal according to the present disclosure includes a terminal substrate 1. The terminal substrate 1 is provided with a fixing portion for connecting with an electric device and a connecting portion for connecting with a wire 2. The fixing portion is provided with an assembly structure for being assembled with the electric device. The connecting portion is provided with a boss 13 formed by punching the connecting portion, and the boss 13 is used for connecting with the wire 2.

On the basis of the above solution, in the First Embodiment, the surface of the fixing portion or/and the connecting portion according to the present disclosure is provided with a plating layer, so as to prevent the terminal surface from being corroded due to long-term exposure to air and moisture, which may render terminal invalid. The plating layer may be provided on the entire surface of the fixing portion or/and the connecting portion, or on part of the surface where the terminal may be exposed when used.

As the thickness of the plating layer affects the electrical and mechanical properties of the terminal, in order to ensure the electrical and mechanical properties of the terminal and at the same time play a role of corrosion protection to the terminal surface, on the basis of the above Frist Embodiment, as a further exemplary solution, the plating layer according to the present disclosure has a thickness of 0.01 mm to 1000 μm.

In order to understand the influence of the thickness of the plating layer on the performance of the wire connection terminal, the inventor makes novel wire connection terminals with terminal substrates of the same thickness and material, provides plating layers of different thicknesses on the fixing portion or/and the connecting portion of the novel wire connection terminals, and makes welding joints using the novel wire connection terminals and the same wire. After 48 hours of salt spray experiments on the welding joints, the inventor has conducted a series of mechanical and electrical tests on the welding joints. As shown in Table 4.

TABLE 4

Influence of different thicknesses of the anti-corrosion protection layers on the performance of electric joints

| Cross-sectional area of the wire | Thickness of anti-corrosion protection layers (μm) | | | | | | | |
|---|---|---|---|---|---|---|---|---|
| | 0.001 | 0.005 | 0.01 | 0.05 | 0.1 | 0.5 | 1 | 10 |
| | Pulling force of electric joints after 48 hours of salt spray experiments (N) | | | | | | | |
| 35 | 62 | 92 | 215 | 287 | 304 | 327 | 336 | 359 |
| | Voltage drop of electric joints after 48 hours of salt spray experiments (mV) | | | | | | | |
| 35 | 0.93 | 0.84 | 0.49 | 0.45 | 0.39 | 0.37 | 0.34 | 0.31 |

| Cross-sectional area of the wire | Thickness of anti-corrosion protection layers (μm) | | | | | | | |
|---|---|---|---|---|---|---|---|---|
| | 50 | 100 | 300 | 500 | 800 | 1000 | 1100 | 1200 |
| | Pulling force of electric joints after 48 hours of salt spray experiments (N) | | | | | | | |
| 35 | 375 | 383 | 346 | 308 | 279 | 219 | 153 | 129 |
| | Voltage drop of electric joints after 48 hours of salt spray experiments (mV) | | | | | | | |
| 35 | 0.28 | 0.26 | 0.34 | 0.37 | 0.41 | 0.49 | 0.67 | 0.92 |

As can be seen from the above Table, when the thickness of the plating layer of the novel wire connection terminal is less than 0.01 μm, after 48 hours of salt spray experiments, the pulling force of the corresponding welding joint decreases obviously to below 200N and the voltage drop obviously exceeds 0.5 mV, which does not satisfy the mechanical and electrical properties of the welding joint.

When the thickness of the plating layer of the novel wire connection terminal is more than 1000 μm, after the salt spray test, the pulling force of the corresponding welding joint is smaller than 200N and the voltage drop is greater than 0.5 mV, which does not satisfy the mechanical and electrical properties of the welding joint.

Therefore, the inventor sets the thickness of the plating layer to be between 0.01 μm and 1000 μm. A user can select a suitable thickness of the plating layer according to the actual use requirements.

As a further exemplary embodiment, the terminal substrate 1 according to the present disclosure is a copper plate with a flatness not greater than ±85 mm. By controlling the flatness of the copper plate, it is possible to avoid the problem of inaccurate punching dimensions caused by uneven surface of the copper plate during punching. The copper plates with different flatness are tested, and the data in Table 5 are obtained.

On the basis of the First Embodiment, the assembly structure in the Second Embodiment according to the present disclosure is a mounting post 12 provided on the fixing portion. When the terminal is to be matched to a through hole of an installation environment, or to be connected with other terminals having through holes, the mounting post 12 on the fixing portion in this embodiment may be matched and connected with the corresponding through hole.

The cross section of the mounting post of the present disclosure is circular, oval, polygonal, or special-shaped. Likewise, different cross-sectional shapes of the mounting posts are intended to match through holes of different shapes.

As a further solution, the mounting post according to the present disclosure is a threaded post, which can be more conveniently fitted with the nut, so that the terminal can be quickly fitted with the through hole.

As a further solution, in order to set the mounting post, the mounting post according to the present disclosure is connected to the fixing portion by friction welding, resistance welding, ultrasonic welding, electromagnetic welding, pressure diffusion welding, arc welding, or riveting.

It should be noted that the friction welding is to perform welding using friction welding equipment, which rotates a first workpiece and causes a second workpiece to apply pressure to the rotating first workpiece, so heat is generated by friction and the first and second workpieces are welded together by the pressure. The friction welding has advantages of fast welding speed without pollution such as noise, smoke, and strong light.

TABLE 5

| Influence of flatness on dimensional accuracy of punching | | | | | | | | | | | | | |
|---|---|---|---|---|---|---|---|---|---|---|---|---|---|
| Flatness (mm) | | | | | | | | | | | | | |
| ±10 | ±20 | ±30 | ±40 | ±50 | ±60 | ±65 | ±70 | ±75 | ±80 | ±85 | ±90 | ±95 | ±100 |
| Machining accuracy of terminal (±mm) | | | | | | | | | | | | | |
| 0.02 | 0.02 | 0.02 | 0.02 | 0.02 | 0.03 | 0.03 | 0.03 | 0.03 | 0.03 | 0.03 | 0.05 | 005 | 0.08 |

During punching production, copper plates with a flatness greater than ±85 mm cannot enter the punching equipment, so the terminal punching operation cannot be performed. When the flatness of the copper plate is not greater than ±85 mm, the processing accuracy of the terminal can reach ±0.03 mm after being processed by the punching equipment, so the positions of the mounting hole 11 and the boss 13 can be accurately set.

As a further solution, the cross section of the boss 13 of the present disclosure is circular, oval, polygonal, or special-shaped, so the boss 13 can be connected to wires with different-shaped cross sections.

As a further solution, the assembly structure of the present disclosure is a mounting hole 11, and the mounting hole 11 is a through hole formed by punching the fixing portion. In an installation environment matched with the terminal, it may be a fixed stud through which the through hole of the terminal fixing portion penetrates, and then fixed with a nut.

As a further solution, the mounting hole 11 of the present disclosure is a circular hole, an oval hole, a waist-shaped hole, an oblong hole, a polygonal hole, or a special-shaped hole. In order to adapt to different installation environments and to facilitate the installation of the terminal, the mounting hole 11 can be set to different shapes. In addition, by setting the mounting hole to different shapes, the mounting size of the terminal on the fixed stud can be adjusted, thereby facilitating the installation of the wire harness.

The Second Embodiment

Figure 3:
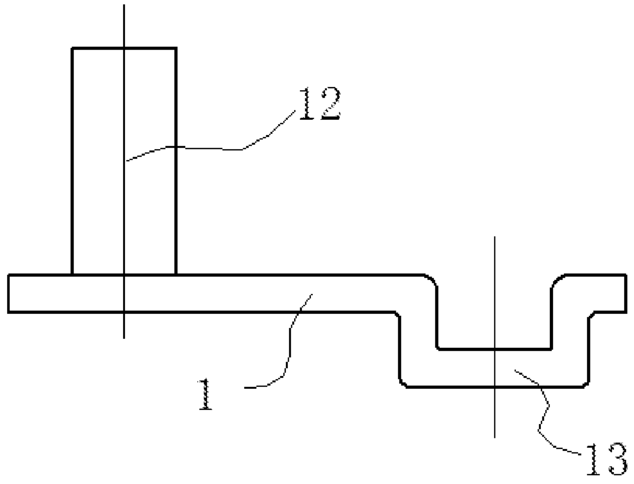
FIG. 3 is a side view of a wire connection terminal according to the Second Embodiment of the present disclosure.

The novel wire connection terminal shown in FIG. 3 is basically the same as the First Embodiment except for the following differences.

The resistance welding uses resistance heat generated by the current passing through weldments and the contact place thereof as a heat source to heat the weldments locally, and at the same time, pressure is applied for welding. The advantages are that no filler metal is required, the productivity is high, the deformation of the weldment is small, and the automation is easy to realize.

The ultrasonic welding is to transmit high frequency vibration waves to surfaces of two objects that need to be welded. Under pressure, fusion between the molecular layers is formed by rubbing the surfaces of the two objects against each other, which has the advantages of short welding time, no need of any flux, gas, or solder, no spark for welding, environmentally friendly and safe.

The electromagnetic welding is to generate a strong magnetic field by utilizing instantaneous electric current, such that weldments are welded together under the action of magnetic field force, which has the advantages of non-contact welding, high welding speed, low welding internal stress, and high machining precision.

The pressure diffusion welding is to press two weldments together, and metallurgically connect the weldments by interatomic diffusion through heat preservation, which has advantages that the weldments are not overheat or melted, the quality of the welding joint is high, a large-area weldment can be welded, the welding precision of the weldments is high, and the deformation is small.

The arc welding is a physical phenomenon using an electric arc as a heat source and discharging electricity utilizing air, to convert the electric energy into the heat and mechanical energy required for welding, so as to achieve the purpose of connecting metal. The arc welding has advantages that the welding environment is not limited, and it is suitable for welding weldments with various metal materials, various thicknesses and various structural shapes. Plasma welding, as a kind of arc welding, can be used to realize precise welding. The plasma arc has concentrated energy, high productivity, fast welding speed, small stress deformation and more stable arc.

The riveting is a connection method of riveting and fitting the mounting post that is interference-fitted with the mounting hole of the fixing portion by pressure.

The Third Embodiment

Figure 4:
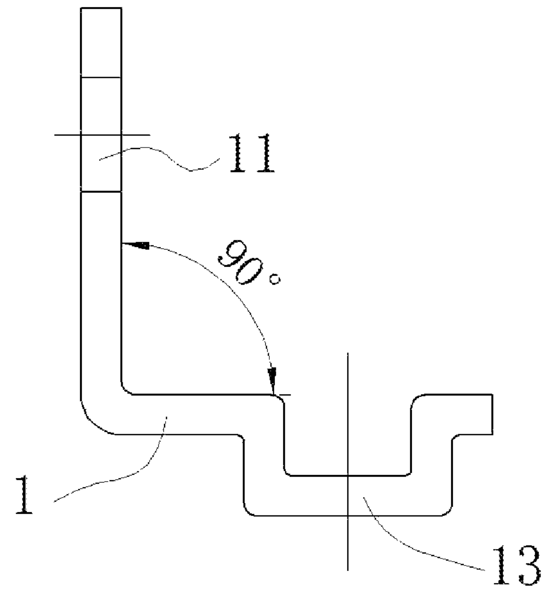
FIG. 4 is a side view of a wire connection terminal according to the Third Embodiment of the present disclosure.
Figure 5:
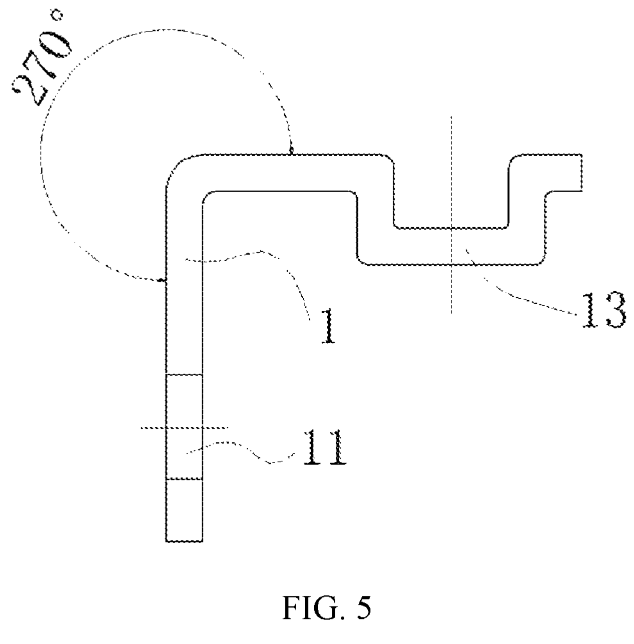
FIG. 5 is a side view of a wire connection terminal according to the Third Embodiment of the present disclosure.

In the novel wire connection terminals shown in FIGS. 4 and 5, the angle between the fixing portion and the connecting portion is 90 degrees and 270 degrees, respectively, and other configurations of the novel wire connection terminals are the same as those in the First Embodiment.

As a further solution, in the present disclosure, the angle between the fixing portion and the connecting portion is more than 0 degrees, and less than or equal to 270 degrees.

In order to meet the installation requirements of different angles of the terminal, after a punching on a flat terminal is completed, an angle is formed by punching between the fixing portion and the connecting portion, so as to adapt to different installation requirements of the terminal.

If the angle between the fixing portion and the connecting portion is equal to 0 degrees, the fixing portion and the connecting portion are bent in a reverse direction and attached to each other. In this case, rapid processing cannot be performed, and there is no use environment for actual use. Therefore, the angle between the fixing portion and the connecting portion is not set to 0 degrees.

If the angle is more than 270 degrees, the fixing portion has been bent to above the boss, which affects the welding connection of the novel wire connection terminal and the wire. Therefore, the angle between the fixing portion and the connecting portion is less than or equal to 270 degrees.

The Fourth Embodiment

Figure 6:
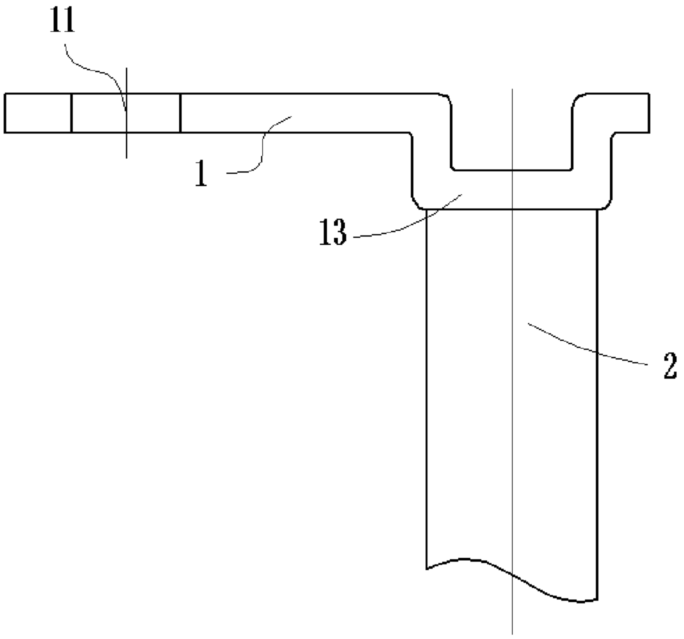
FIG. 6 is a side view of a welding joint according to the Fourth Embodiment of the present disclosure.

As shown in FIG. 6, the present disclosure also provides a welding joint, which includes a novel wire connection terminal according to any of the above solutions and a wire. The wire 2 is connected to a boss 13 of the novel wire connection terminal by welding.

Exemplary, the welding may be friction welding, resistance welding, ultrasonic welding, electromagnetic welding, pressure diffusion welding, or arc welding.

It should be noted that the friction welding is to perform welding using friction welding equipment, which rotates a first workpiece and causes a second workpiece to apply pressure to the rotating first workpiece, so heat is generated by friction and the first and second workpieces are welded together by the pressure. The friction welding has advantages of fast welding speed without pollution such as noise, smoke, and strong light.

The resistance welding uses resistance heat generated by the current passing through weldments and the contact place thereof as a heat source to heat the weldments locally, and at the same time, pressure is applied for welding. The advantages are that no filler metal is required, the productivity is high, the deformation of the weldment is small, and the automation is easy to realize.

The ultrasonic welding is to transmit high frequency vibration waves to surfaces of two objects that need to be welded. Under pressure, fusion between the molecular layers is formed by rubbing the surfaces of the two objects against each other, which has the advantages of short welding time, no need of any flux, gas, or solder, no spark for welding, environmentally friendly and safe.

The electromagnetic welding is to generate a strong magnetic field by utilizing instantaneous electric current, such that weldments are welded together under the action of magnetic field force, which has the advantages of non-contact welding, high welding speed, low welding internal stress, and high machining precision.

The pressure diffusion welding is to press two weldments together, and metallurgically connect the weldments by interatomic diffusion through heat preservation, which has advantages that the weldments are not overheat or melted, the quality of the welding joint is high, a large-area weldment can be welded, the welding precision of the weldments is high, and the deformation is small.

The arc welding is a physical phenomenon using an electric arc as a heat source and discharging electricity utilizing air, to convert the electric energy into the heat and mechanical energy required for welding, so as to achieve the purpose of connecting metal. The arc welding has advantages that the welding environment is not limited, and it is suitable for welding weldments with various metal materials, various thicknesses and various structural shapes. Plasma welding, as a kind of arc welding, can be used to realize precise welding. The plasma arc has concentrated energy, high productivity, fast welding speed, small stress deformation and more stable arc.

The above embodiments are only exemplary embodiments of the present disclosure, and the scope of protection of the present disclosure is not limited thereto. Any non-essential changes and substitutions made by those skilled in the art on the basis of the present disclosure are within the scope of the claimed invention.

The invention claimed is:

1. A novel wire connection terminal comprising a terminal substrate provided with a fixing portion for connecting with an electric device and a connecting portion for connecting with a wire, wherein:

the fixing portion is provided with an assembly structure for being assembled with the electric device, and the connecting portion is provided with a boss projecting in an axial direction of the wire and projecting towards the wire, the boss being formed by punching the connecting portion for connecting with the wire and being provided with an outer end face parallel to a cross section of the boss for connecting with an end face of the wire.

2. The novel wire connection terminal according to claim 1, wherein the surface of the fixing portion or/and the connecting portion is provided with a plating layer.

3. The novel wire connection terminal according to claim 1, wherein the terminal substrate is a copper plate with a flatness not greater than ±85 mm.

4. The novel wire connection terminal according to claim 1, wherein the cross section of the boss is circular, oval, polygonal, or special-shaped.

5. The novel wire connection terminal according to claim 1, wherein the assembly structure is a mounting hole, and the mounting hole is a through hole formed by punching the fixing portion.

6. The novel wire connection terminal according to claim 1, wherein the assembly structure is a mounting post provided on the fixing portion.

7. The novel wire connection terminal according to claim 6, wherein the cross section of the mounting post is circular, oval, polygonal, or special-shaped.

8. The novel wire connection terminal according to claim 6, wherein the mounting post is a threaded post.

9. The novel wire connection terminal according to claim 1, wherein the angle between the fixing portion and the connecting portion is more than 0 degrees, and less than or equal to 270 degrees.

10. The novel wire connection terminal according to claim 1, wherein the outer end face of the boss is a flat surface and is perpendicular to a centerline of the boss, and wherein the outer end face of the boss is parallel to the end face of the wire.

11. The novel wire connection terminal according to claim 1, wherein the outer end face of the boss extends continuously from a centerline of the boss in a cross-sectional direction of the boss to an outer peripheral surface of the boss.

12. The novel wire connection terminal according to claim 1, wherein the outer end face of the boss has an area that is not less than an area of the end face of the wire.

13. The novel wire connection terminal according to claim 1, wherein the boss extends from a lower surface of the terminal substrate in the axial direction of the wire to the outer end surface of the boss.

14. The novel wire connection terminal according to claim 13, wherein the boss has an internal groove that extends from an upper surface of the terminal substrate in the axial direction of the wire to an inner end face of the boss.

15. A welding joint comprising a novel wire connection terminal and a wire, wherein the novel wire connection terminal comprises a terminal substrate provided with a fixing portion for connecting with an electric device and a connecting portion for connecting with a wire, wherein:

the fixing portion is provided with an assembly structure for being assembled with the electric device;

the connecting portion is provided with a boss projecting in an axial direction of the wire and projecting towards the wire, wherein the boss is formed by punching the connecting portion for connecting with the wire and is provided with an outer end face parallel to a cross section of the boss for connecting with an end face of the wire; and the end face of the wire is connected to the outer end face of the boss of the novel wire connection terminal by welding.

16. The welding joint according to claim 15, wherein the outer end face of the boss is a flat surface and is perpendicular to a centerline of the boss, and wherein the outer end face of the boss is parallel to the end face of the wire.

17. The welding joint according to claim 15, wherein the outer end face of the boss extends continuously from a centerline of the boss in a cross-sectional direction of the boss to an outer peripheral surface of the boss.

18. The welding joint according to claim 15, wherein the outer end face of the boss has an area that is not less than an area of the end face of the wire.

19. The welding joint according to claim 15, wherein the end face of the wire and the outer end face of the boss are welded to form a weld surface that is spaced from the terminal substrate by a distance equal to a height of the boss in the axial direction of the wire.

20. The welding joint according to claim 15, wherein the boss extends from a lower surface of the terminal substrate in the axial direction of the wire to the outer end surface of the boss, and wherein the boss has an internal groove that extends from an upper surface of the terminal substrate in the axial direction of the wire to an inner end face of the boss.

* * * * *